(12) United States Patent
Pinches et al.

(10) Patent No.: US 6,277,341 B1
(45) Date of Patent: Aug. 21, 2001

(54) PROCESS FOR THE RAPID LEACHING OF CHALCOPYRITE IN THE ABSENCE OF CATALYSTS

(75) Inventors: Anthony Pinches, Pretoria; Peter J. Myburgh, Windsor; Charmaine van der Merwe, Roodepoort, all of (ZA)

(73) Assignee: Mintek, Gauteng (ZA)

( * ) Notice: Subject to any disclaimer, the term of this patent is extended or adjusted under 35 U.S.C. 154(b) by 0 days.

(21) Appl. No.: 09/380,637

(22) PCT Filed: Mar. 3, 1997

(86) PCT No.: PCT/GB97/00585

§ 371 Date: Nov. 24, 1999

§ 102(e) Date: Nov. 24, 1999

(87) PCT Pub. No.: WO98/39491

PCT Pub. Date: Sep. 11, 1998

(51) Int. Cl.$^7$ .................................................. C22B 15/00
(52) U.S. Cl. ................... 423/27; 423/28; 423/41
(58) Field of Search ................... 423/27, 28, 29, 423/31, 32, 33, 38, 39, 40, 41

(56) References Cited

U.S. PATENT DOCUMENTS

| | | |
|---|---|---|
| 2,829,964 | 4/1958 | Zimmerley et al. . |
| 3,305,353 | 2/1967 | Duncan et al. . |
| 3,856,913 | 12/1974 | McElroy et al. . |
| 3,962,402 | 6/1976 | Touro . |
| 4,115,221 * | 9/1978 | Wadsworth et al. .................... 423/41 |
| 4,256,553 * | 3/1981 | Baczek et al. ....................... 204/106 |
| 4,571,387 | 2/1986 | Bruynesteyn et al. . |

FOREIGN PATENT DOCUMENTS

| | | |
|---|---|---|
| 1467-94 | 3/1998 | (CL) . |
| 1674-96 | 2/1999 | (CL) . |
| 1 528 061 | 10/1978 | (GB) . |

OTHER PUBLICATIONS

Mateos, et al., "The passivation of chalcopyrite subjected to ferric sulfae leaching and its reactivation with metal sulfides," Hydrometallurgy, 19, 1987, no month, pp. 159–167.*

Ahonen, et al., "Redox potential controlled bacterial leaching of chalcopyrite ores", Biohydrometallurgical Tech., The Minerals, Metals & Materials Society, 1993, no month, pp. 571–578.*

Ahonen, Lasse and Olli H. Tuovinen, "Catalytic Effects of Silver in the Microbiological Leaching of Finely Ground Chalcopyrite–containing Ore Materials in Shake Flasks," Hydrometallurgy 24(2):219–236 (Mar. 1990).

Balaz, P. et al., "Combined chemical and bacterial leaching of ultrafine ground chalcopyrite," Hydrometallurgy 42(2):237–244 (1996), no month.

Ferron, C.J. and C.A. Fleming, "Hydrometallurgical processing of copper concentrates," Proceedings of Copper 95–COBRE 95 International Conference, vol. III, pp. 535–548, no date.

Garrels, R.M. et al., "Solutions, Minerals, and Equilibria," Editorial Harper and Row (1995), Figs. 7.1 and 7.24, no month.

* cited by examiner

*Primary Examiner*—Steven Bos
(74) *Attorney, Agent, or Firm*—Christensen O'Connor Johnson Kindness PLLC

(57) ABSTRACT

A process is provided for the leaching of copper from chalcopyrite using ferric sulfate in which acceptable rates of leaching are achieved by controlling the surface potential of the chalcopyrite to an empirically determined "window" within the broad range of 350 to 450 mV. The most effective process conditions involve the selection of the said surface potential; the leach temperature; the pH of the leach solution; and the fineness of the grind of the chalcopyrite. The invention may be applied to both tank leaching and heap leaching processes.

7 Claims, 11 Drawing Sheets

CONTINUOUS CHALCOPYRITE LEACHING (TEST No 5)

COLUMN LEACHING

PROCESS FOR THE RAPID LEACHING OF CHALCOPYRITE IN THE ABSENCE OF CATALYSTS

FIELD OF THE INVENTION

This invention relates to the leaching of chalcopyrite in order to recover the copper values therein and more particularly to a process in which ferric ions which are preferably, but not necessarily, bacterially generated, are employed to effect oxidation of the sulphide material in the chalcopyrite.

BACKGROUND TO THE INVENTION

The leaching of sulphide materials using ferric sulphate to oxidise the sulphide mineral usually leads to rapid oxidation and thus dissolution of the required values. The surface potential of the mineral in such a case is usually in the range of 550 to 660 mV and the rate of leaching is henerally expected to increase with increasing potential. This is the case for such sulphide minerals as pyrite ($FeS_2$); arsenopyrite (FeAsS); chalcocite ($Cu_2S$); and sphalerite (ZnS).

However, in the case of chalcopyrite, leaching using ferric sulphate takes an inordinate length of time, presumably as a consequence of passivation of the exposed surfaces of the sulphide material. The exact nature of the mechanism whereby passivation occurs is not entirely clear and is presumed to be due to the formation of a passivating film on the chalcopyrite crystal surface which thus forms a diffusion barrier.

One attempt to overcome this difficulty has been the proposed use of activators or catalysts in the leaching system. One successful catalyst has been shown to be silver (see for example U.S. Pat. No. 3,856,913). However, as far as Applicant is aware, no commercial process has been developed to operate utilising such a catalyst presumably because of the high cost of silver and difficulties experienced in recovering it for recycle purposes. Other proposals have been the use of HgS; $As_2S_3$; SnS; and CoS. None of these have proved to be commercially successful as far as the Applicant can determine.

Ahonen and Tuovinen, Hydrometallurgy, Vol. 24, No. 2, March 1990, 219–236 discloses the catalytic effects of silver in the microbiological leaching of finely ground chalcopyrite-containing ore materials in shake flasks. U.S. Pat. No. 4,571,387 relates to leaching copper from copper sulphide containing ore using sulphide oxidizing bacteria and a catalytic amount of silver.

It is, accordingly, the object of this invention to provide an effective process for leaching chalcopyrite without the use of any costly or deleterious activators or catalysts.

SUMMARY OF THE INVENTION

In accordance with this invention there is provided a process for leaching chalcopyrite in which ferric sulphate is used to oxidise the sulphide material, the process being characterised in that the process conditions are actively controlled to cause the surface potenfial of the chalcopyrite to be maintained within the range of 350–450 mV measured against a standard Calomel reference electrode for at least a significant time period during which leaching is carried out.

Further features of the invention provide for the process conditions to be actively controlled by controlling at least the ferric ion ($Fe^{3+}$) to ferrous ion ($Fe^{2+}$) ratio with such control being carried out by controlling the oxygen supply to the ferrous ion oxidation process, and for the oxidation of the ferrous ions to ferric ions to be carried out using a bacterial oxidation process, preferably conducted in a separate reaction vessel in which case the residence time of circulating leach solution in the bacterial oxidation vessel may be actively controlled.

Additional features of the invention provide for the chalcopyrite to be fine milled prior to leaching in order to increase the available surface area thereof and promote crystallographic dislocations; for the oxidation of elemental sulphur products to be prevented during the leaching process; and for leaching to be carried out at elevated temperature.

Still further features of the invention provide for the leach solution to be circulated from the leach process to a copper removal step such as a solvent extraction or an electrowinning process in which dissolved copper is removed to some extent prior to circulating the leach solution to a bacterial ferric ion regeneration step preparatory to the leach solution being returned to the leach process in a continuous circuit.

In the implementation of this invention, it is important that the surface potential of the chalcopyrite be maintained in a narrow band within that specified. In this regard it is to be noted that the equilibrium potential measured using a platinum electrode in circuit with a Calomel electrode the slurry redox potential may be found to represent a mixed potential consequent on the contact between the "corroding" sulphide particles and the platinum electrode. Factors such as the presence of more electro-chemically active minerals such as chalcocite with the chalcopyrite, or the contact of less electro-chemically active minerals such as pyrite with the chalcopyrite (galvanic effects), will accentuate the difference between the true surface potential and the slurry potential measured using a platinum electrode. Ideally, the surface potential of the chalcopyrite should thus be measured directly using a chalcopyrite crystal electrode or composite electrode made from chalcopyrite powder or concentrate. Moreover, due to the slow kinetics associated with chalcopyrite leaching the difference between the slurry redox potential and the chalcopyrite surface potential will in all probability be small (less than 20 mV).

Impurities present in the chaloopyrite are also thought to play a catalytic role in promoting chalcopyrite instability and consequent solubility. This effect, plus the effectiveness of fine milling on promoting instability, is sample specific and is dependant on the origin of the sample. This will result therefore from differing geophysical conditions under which the chalcopyrite was formed and the different levels of impurities embodied therein.

The most cost effective process to be used on any particular ore or concentrate will be determined empirically with the four basic variables being:
(i) the surface potential of the chalcopyrite;
(ii) the temperature at which the leach is effected;
(ii) the pH at which leaching is effected; and
(iv) the fineness to which the ore or concentrate is ground.

In regard to the above it has been found that the surface potential range or "window" varies for different chalcopyrites, and apparently depends on mineralogical characteristics related to crystal structure, crystal impurities and associated minerals and impurities present in the ore being treated. Similarly, the most cost effective temperature, pH, and fineness of ground will vary.

The application of the process of this invention can be expanded to include not only processes treating chalcopyrite-containing concentrates by stirred tank leaching methods, but also processes for treating chalcopyrite-containing ores by simple heap percolation leaching methods.

Control of the surface potential or more generally, in a leach process, the slurry redox potential, can be achieved in any convenient manner as will be apparent to those skilled in the art such as, for example, by controlling the supply of $O_2$ to the oxidation process and/or by varying the residence time in a separate ferric ion generation reaction.

In order that the invention may be more fully understood, various tests which have been carried out will now be described with reference to the accompanying drawings.

DETAILED DESCRIPTION WITH REFERENCE TO THE DRAWINGS

Leach Test No. 1 (Comparative)

Figure 1:
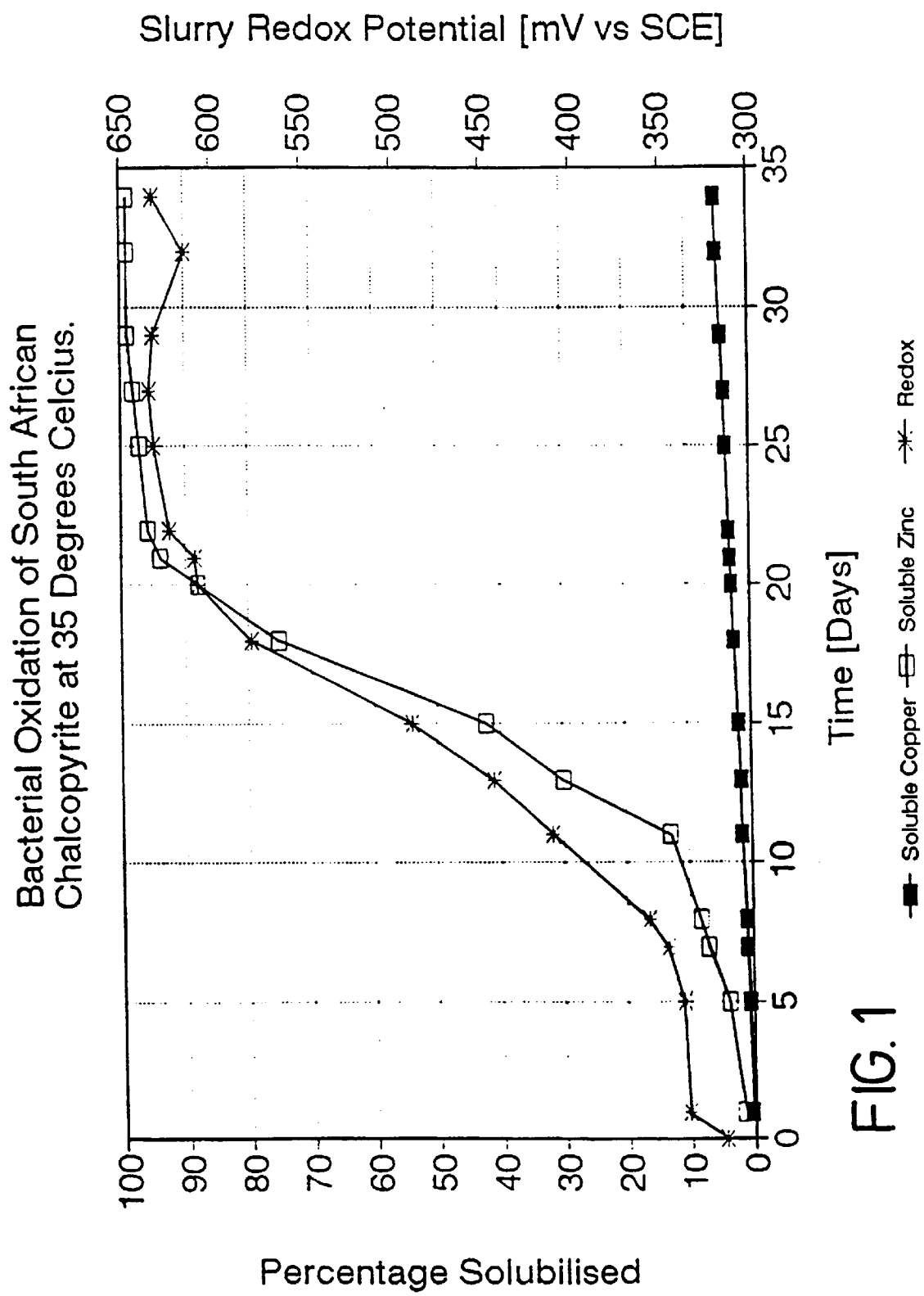
FIGS. 1–3 are each graphical representations of results obtained showing copper and zinc dissolution over a period of time and also showing the slurry redox potential on a second y axis in terms of the prior art.

FIG. 1 shows the results of a batch bioleach test using a South African copper-zinc sulphide flotation concentrate and in which no active control over the process variables was exercised in order to control the surface potential of the chalcopyrite. The concentrate assayed 28% copper, 33% sulphide, 32% iron and 2% zinc. The copper was present almost exclusively as chalcopyrite and the zinc as sphalerite.

The bioleach test was carried out in a plastic tank containing 2 liters of a concentrate slurry. The tank had a conical base with the air introduced at the base of the cone serving to both mix the slurry and provide the oxygen and carbon dioxide required for the bioleach reactions. The carbon dioxide in the air supplied was supplemented by additional carbon dioxide gas to give an overall volumetric concentration of approximately 1000 parts-per-million of carbon dioxide. The temperature of the bioleach slurry was controlled at approximately 35° C. using an infra red lamp heating the outside of the plastic tank. The initial concentration of concentrate (mass basis) was 15%. The fineness of the concentrate grind was 80% passing a 75 $\mu$m screen. The leach medium contained inorganic mineral sat nutrients required by the bacteria for growth, where the concentration of these in grammes per liter of liquor was—ammonium sulphate 2; di-potassium hydrogen phosphate 0.5; magnesium sulphate 0.5; and calcium nitrate 0.05. At the beginning of the test sulphuric acid was added to adjust the initial pH to 1.8 before the bacterial culture was added. The bacterial culture used was a mixed culture of iron-oxidising bacteria containing *Thiobacillus ferro-oxidans, Thiobacillus thio-oxidans* and *Leptospirillum ferro-oxidans* bacteria.

The test results shown in FIG. 1 are typical for a batch bioleach test. There is a lag period of about 5 days as bacterial growth starts and there is then a rapid rise in slurry redox to over 600 mV over the next 15 days as the bacteria oxidise iron present as ferrous iron ($Fe^{2+}$) to ferric iron ($Fe^{3+}$). There is concomitant leaching of zinc from sphalerite almost to completion over the period of the leach. The pH dropped to 1.0 over the course of the test indicating that sulphide was being oxidised completely through to sulphuric acid and chemical analyses of the final leach residues confirmed this. The graph in FIG. 1 shows that for leach conditions normally considered optimum for bioleaching of sulphide minerals (a high slurry redox), the leaching of copper from the chalcopyrite only reached around 5% after 34 days. This combination of slow leach kinetics and low copper extraction is typically observed when passivation of chalcopyrite occurs.

Leach Test No. 2 (Comparative)

A second batch bioleach test was carried out on the same South African chalcopyrite. In this case the test was carried out in a stainless steel tank containing 10 liters of concentrate slurry. The slurry was mechanically agitated by means of an overhead stirrer motor driving a stirrer shaft with an attached Rushton turbine impeller situated near the base of the tank. Air enriched with carbon dioxide gas to the same level described in Test No. 1 was introduced just below the impeller. The same initial solids concentration, mineral salts medium, operating temperature as given in Test No. 1 were again used. The main difference in this test was that the concentrate was milled to give a grind of 90% passing 20 micrometers ($\mu$m) as measured using a particle size analyser, and the pH of the slurry was not allowed to decrease below 2.0. This was accomplished by monitoring pH using a combination glass-reference pH probe immersed in the slurry, where this was connected to a meter and a controller which controlled the addition of lime slurry when the pH dropped below 2.0.

Figure 2:
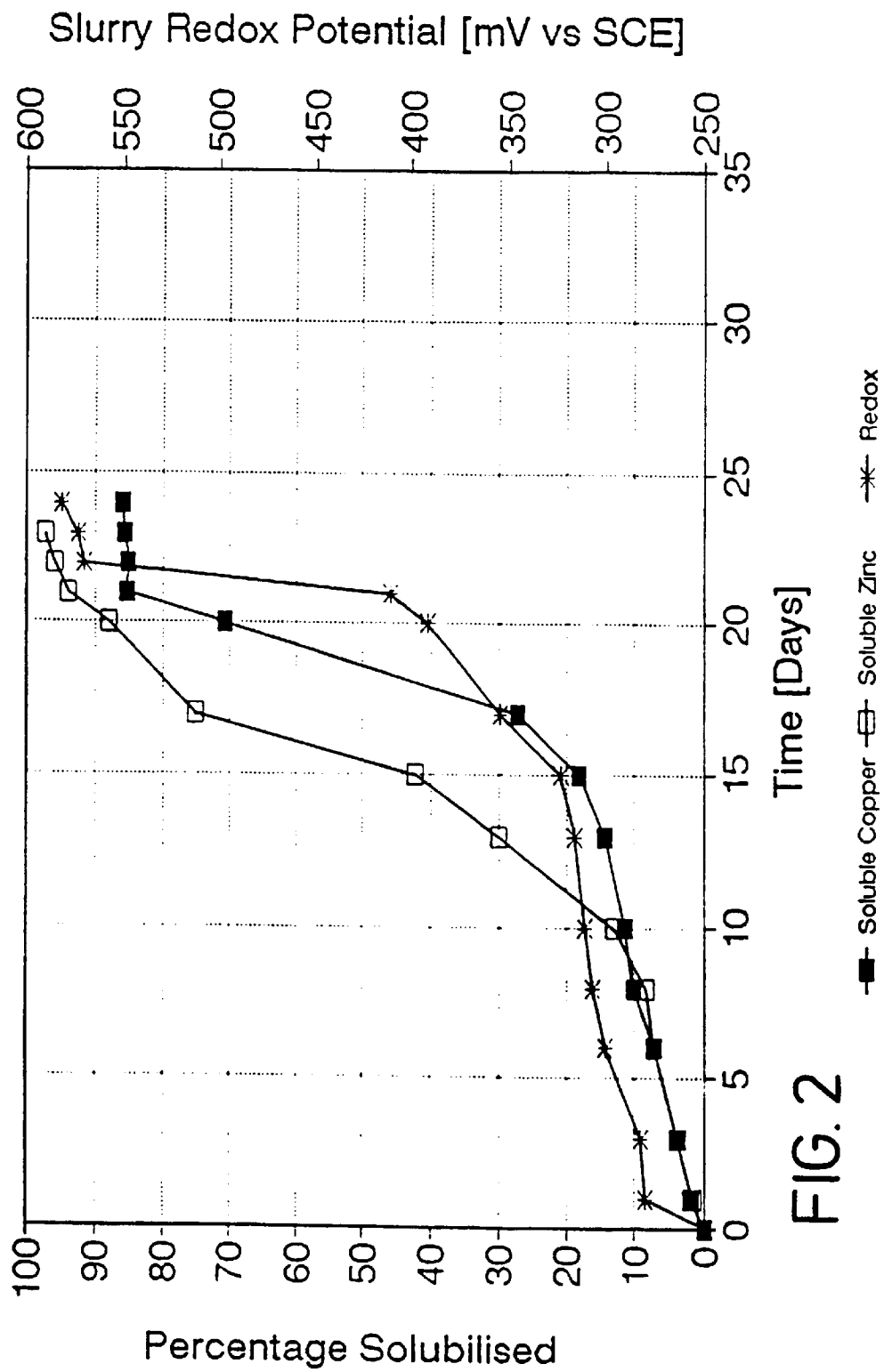

The results of this test are shown in FIG. 2. Over the first 16 days copper leaching reached about 20% and the improved leach rate over the rate obtained in Test No. 1 is largely attributable to the increased chalcopyrite surface area resulting from the finer grind. From day 17 to day 21 there was a marked increase in the copper leach rate, and copper extraction reached 85% by day 21. This period of increased leach rate is directly related to the time period over which the slurry redox potential fell within a narrow range of 350 to 400 mV. After day 21 the slurry redox rapidly increased to above 550 mV and under these conditions copper extraction ceased. On completion of the test, analysis of the final leach residue showed that sulphide oxidation had occurred only as far as elemental sulphur.

Leach Test No. 3 (Comparative)

Figure 3:
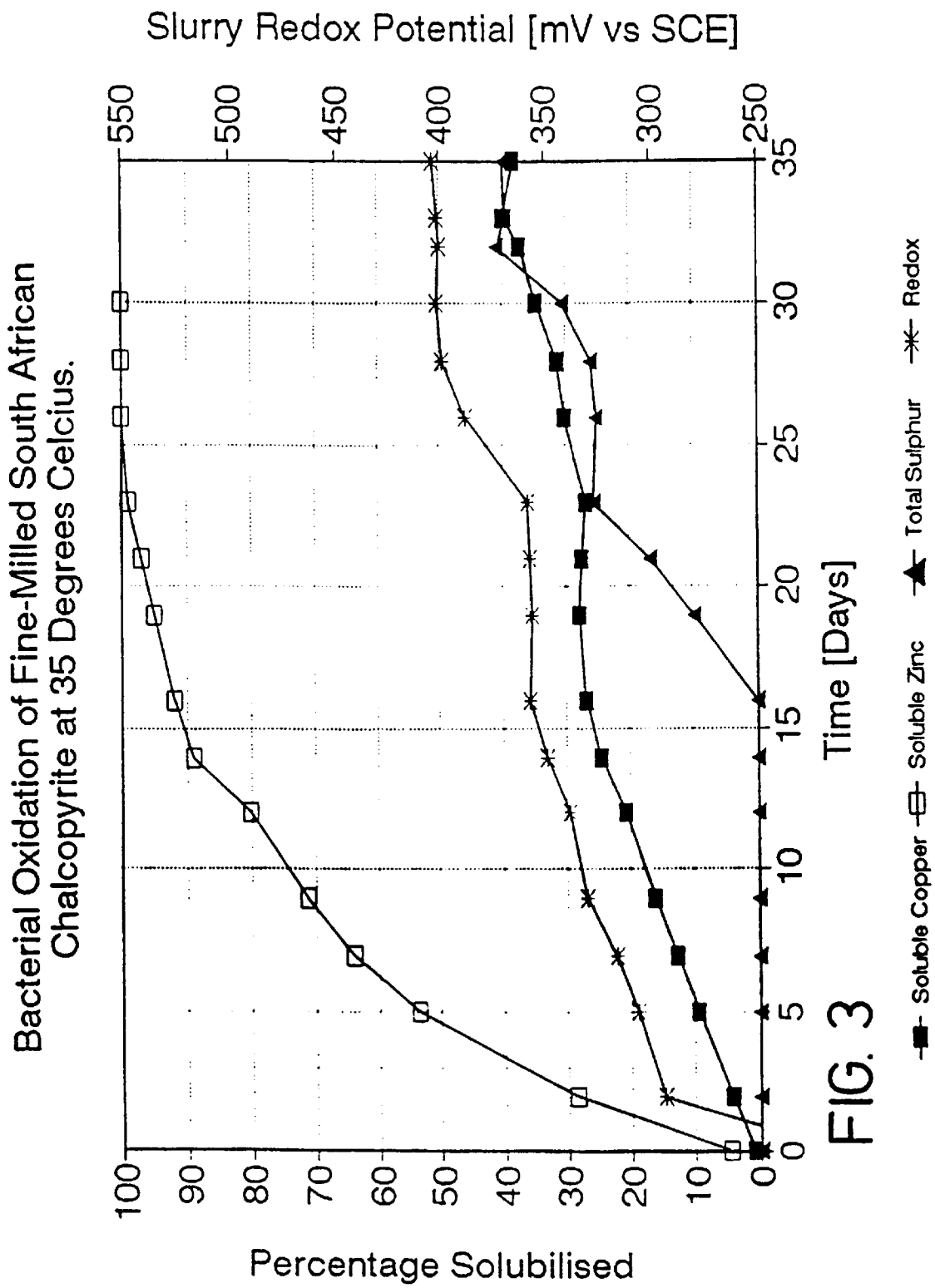

The leach conditions in this comparative test were generally identical to those used in Test No. 2 The results of this test are shown in FIG. 3. The difference between this test and that in Test No. 2 is that on day 16 the pH was allowed to drop below 2.0. This caused the onset of bacterial oxidation of elemental sulphur and, as the data in FIG. 3 shows, there was an immediate decrease in the rate of copper leaching. This result indicates that onset of elemental sulphur oxidation acts to remove reacting components from the surface of the chalcopyrite which had promoted instability of the chalcopyrite, and which subsequently allowed passivation of the chaloopyrite surfaces to occur.

Leach Test No. 4 (The Invention)

Chemical leach tests using dilute sulphuric acid-ferric sulphate leach liquid for oxidation of the chalcopyrite and which closely simulate the bioleach process described in Test No. 3 above were carried out. These tests were carded out in 500 milliliter volume laboratory glass reaction vessels. These reaction vessels were equipped with temperature control by means of a double wall in the glass vessel through which water at the required temperature was passed. The leach slurry was mixed by a magnetically-coupled stirrer at the base of the vessel. The pH of the leach solution was controlled at the required level using a combination glass-reference pH electrode in the vessel connected to an autotitrator which dispensed sulphuric acid to the vessel. The slurry redox was controlled using platinum and reference electrodes in the vessel connected to an autotitrator which dispensed a suitable oxidant solution to the vessel. The volumes of oxidant and acid added over time during the test were recorded on a computer connected to the autotitrators. The oxidant used for redox control was potassium permanganate solution. The addition of this oxidant maintained chosen $Fe^{3+}$:$Fe^{2+}$ ratio where this ratio (through the Nernst equation) has the dominant effect on the measured redox potential.

The leach tests were set up by introducing 13.8 grammes of the finely ground South African concentrate used in Test No's 1 to 4 into the vessel together with an initial 125 milliliters of leach solution at the required pH and an initial iron concentration of 3 grammes per liter. The initial leach solution also contained the bacterial inorganic mineral salt nutrients at the concentrations given for Test No. 1. With the addition of permanganate solution and acid during the course of the test for redox and pH control, respectively, the final slurry volume in the reaction vessels was generally around 400 milliliters.

The tests were carried out with the slurry redox controlled at between 370 and 400 mV and the pH at 1.5. Tests were carried out at temperatures of 35, 55 and 80° C. The levels of copper leached during the course of the tests were calculated from the amount of oxidant added together with the final copper extraction determined by assaying copper remaining in the final concentrate leach residue.

Figure 4:
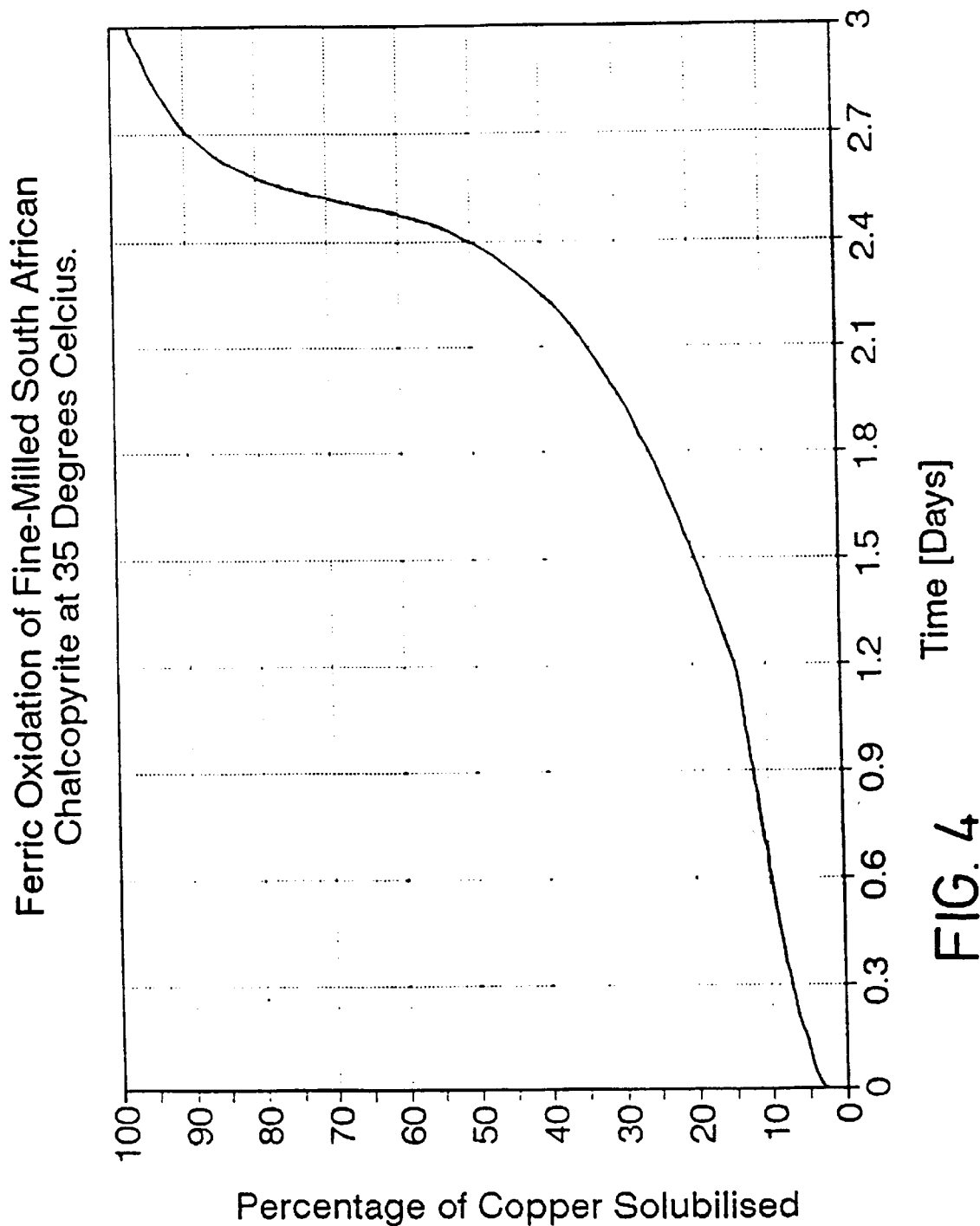
FIGS. 4–6 are each graphs showing dissolution of copper from chalcopyrite under different leaching conditions in accordance with the invention.

The test result at 35° C. is shown in FIG. 4. Examination of the data shows that around 20% of the copper was leached over the first 1.5 days, and thereafter the rate of copper leaching accelerated so that around 98% of the copper was leached after 3 days. The analysis of the final residue showed the sulphide was oxidised to elemental sulphur. In these tests, without bacteria present, it was shown that the pH could be reduced to values below 2.0 without elemental sulphur oxidation and without decreasing the rate of chalcopyrite oxidation.

Figure 5:
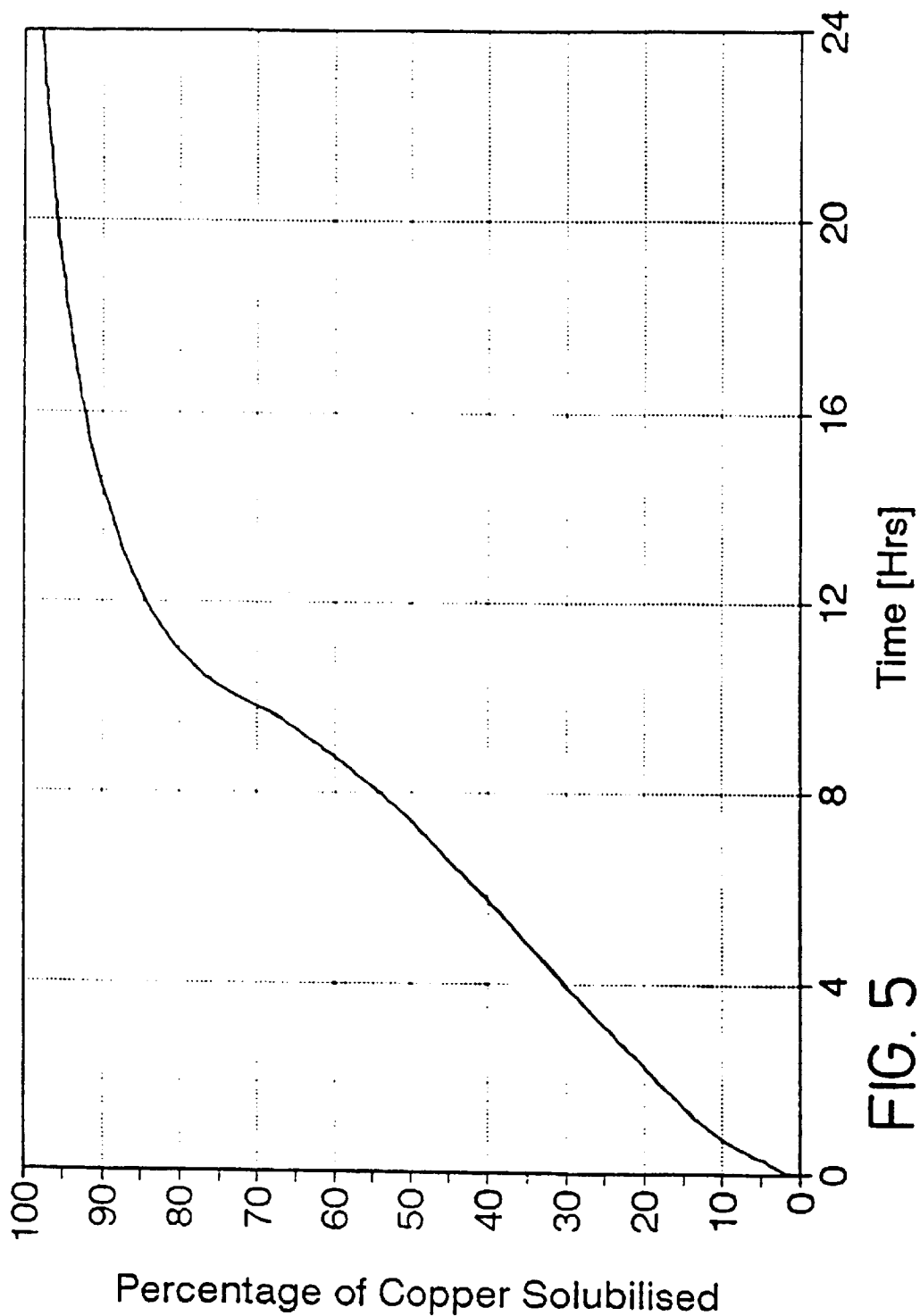
Figure 6:
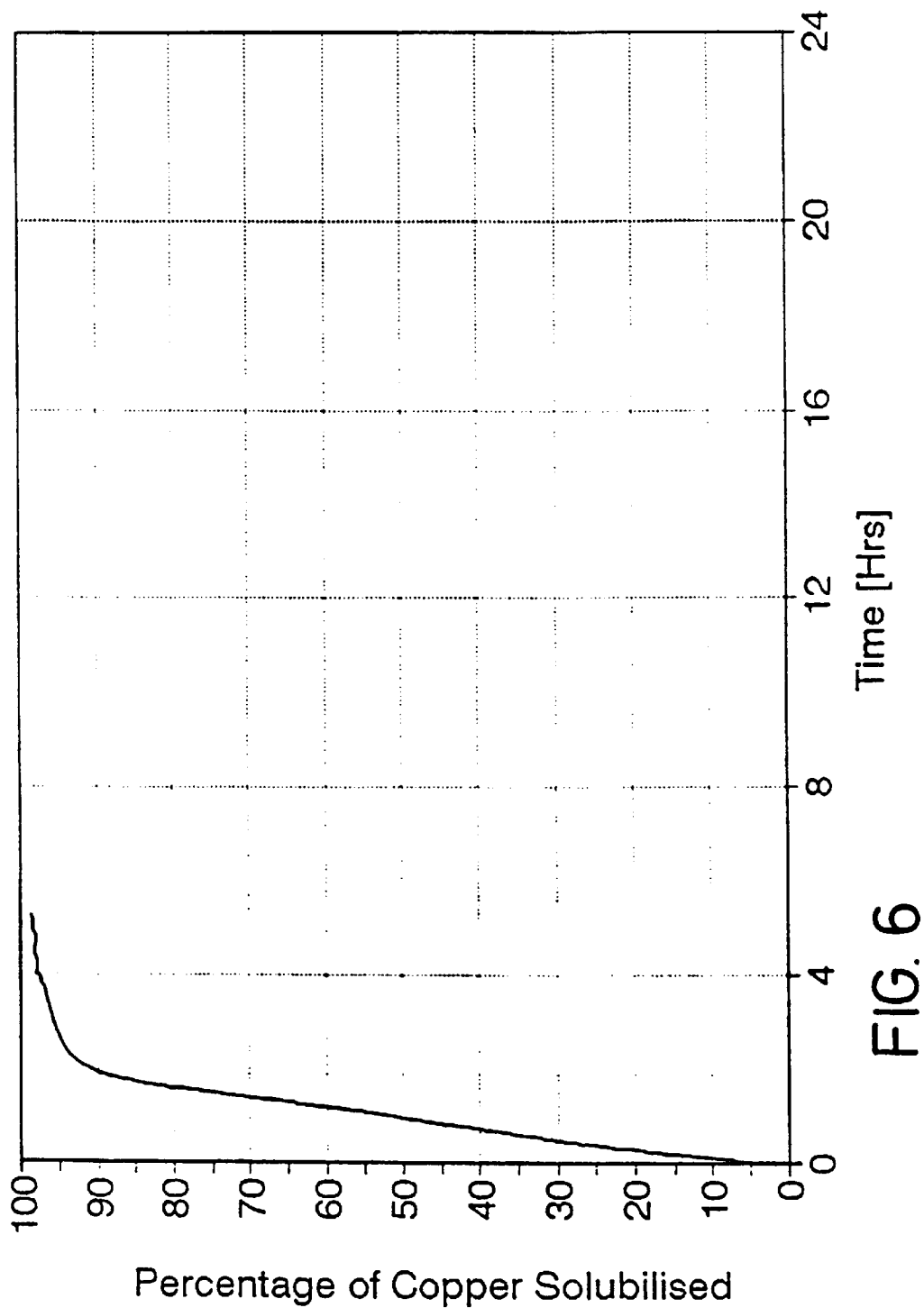

FIGS. 5 and 6 show the same data at 55 and 80° C., respectively, and these data illustrate the improvement in leach rates attainable with increasing temperature. At 55° C. 98% of the copper was extracted within 24 hours, and at 80° C. 98% extraction was achieved in 5 hours.

Leach Test No. 5 (The Invention)

Figure 7:
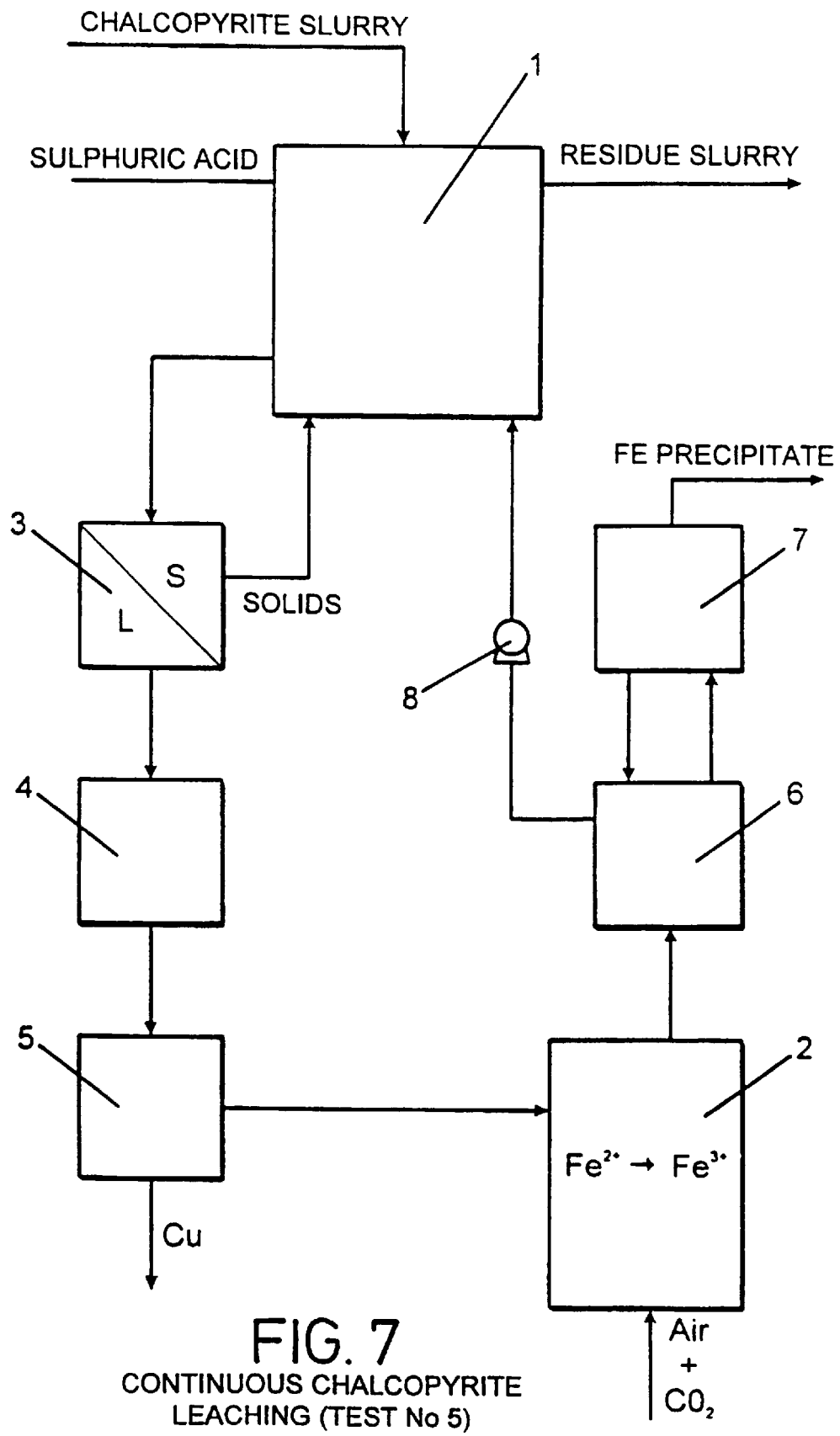
FIG. 7 is a circuit diagram of test equipment used in testing the indirect oxidation of the chalcopyrite.

This test serves to demonstrate the continuous operation of chalcopyrite leaching using bacterially generated ferric ions and illustrates the importance of redox potential control. To achieve this, chalcopyrite was leached by a ferric medium generated in a continuously operated indirect bacterial oxidation system. The indirect oxidation testwork circuit employed is illustrated in FIG. 7.

The sulphide oxidation reactor (1) had a working volume of 10 liters and was operated as a single stage continuous stirred tank reactor (CSTR). The reactor was mechanically agitated but no air was introduced. Chalcopyrite, identical to that used in Test No's 1 to 4 was continuously fed into the reactor as a 10% solids slurry stream. The liquid phase in this stream contained the dissolved bacterial inorganic mineral salts nutrients as described for the previous tests. The volumetric feed rate of the feed slurry was chosen in relation to the required solids residence time. Leach residue slurry was simultaneously removed at the same volumetric rate as that of the feed slurry. Sulphuric acid was also added to the sulphide oxidation reactor for pH control.

The ferric required for the leach reactions in the sulphide oxidation reactor was generated in a separate bacterial ferric iron generator stage (2). To facilitate this, slurry containing dissolved $Fe^{2+}$ produced by the leach reactions was continuously removed from the sulphide oxidation reactor and passed to a solid-liquid separation stage in the form of a simple cone settler (3).

The settled solids were returned to the sulphide oxidation reactor and the liquor passed to a holding tank (4). From this holding tank the liquor was passed to an electrolytic cell (5) to remove copper from solution as copper metal. This was done to maintain the concentration of dissolved copper in the circuit within the required range. The leach solution was then passed to the bacterial ferric ion generator (2) to achieve re-oxidation of the $Fe^{2+}$ to $Fe^{3+}$.

The generator (2) used comprised a 15 liter column containing vertically arranged stainless steel mesh which served to passively immobilise the bacterial cells. The bacterial culture used was the same mixed culture as already described. The generator (2) was sparged with carbon dioxide-enriched air at the base at a flow rate sufficient to ensure that the rate of bacterial $Fe^{2+}$ to $Fe^{3+}$ oxidation was not limited. The temperature in the generator was controlled at approximately 35° C.

From the generator the regenerated liquor, normally at a redox of>600 mV was passed to a second holding tank (6). A portion of the contents of the second holding tank was occasionally manually removed for ferric iron precipitation at (7) to reduce the concentration of total iron in the circuit. The liquor after iron removal was returned to the second holding tank.

The high redox liquor was then passed back to the sulphide oxidation reactor. The redox potential in the sulphide oxidation reactor was controlled by the rate of addition of the high redox high $Fe^{3+}$ liquor, and was monitored by platinum and reference electrodes in the reactor connected to a controller which was in turn connected to a pump (8) connected to the second holding tank (6). The pH in the sulphide oxidation reactor was controlled using a combined glass-reference pH electrode in the reactor connected to a controller which controlled the amount of sulphuric acid dispensed to the reactor.

The indirect bacterial oxidation system was successfully operated continuously over a period of two months. The total iron and copper concentrations were controlled throughout at between 15 and 25 grammes per liter by precipitation of iron and electrowinning of copper respectively. The residence time of the chalcopyrite in the sulphide oxidation reactor was maintained at 24 hours. The temperature in the sulphide oxidation reactor was maintained throughout at 55° C.

The first condition of steady state operation was established with a chalcopyrite surface potential of 380 mV where this corresponded to a measured slurry redox potential in the sulphide oxidation tank controlled at 390 mV. The extent of copper and zinc leached from the feed solids were 74 and 94% respectively. This agrees closely with the 72% copper leaching which can be predicted by combining the purely chemical leaching data for the concentrate at 55° C. shown In Test No. 4 (FIG. 5) with the mathematical modelling of a single-stage CSTR. A second steady state was established under identical test conditions but with a slightly higher controlled slurry redox potential in the sulphide oxidation reactor of 400 mV. At this raised potential the extent of copper leaching dropped to 45%, thus illustrating the sensitivity of the potential which is selected for any particular chalcopyrite. Conversely, the extent of zinc leaching increased to above 94% as would be expected of this sulphide mineral at the higher redox potential.

Leach Test No. 6

A series of chemical leach tests using dilute sulphuric acid-ferric sulphate oxidation was carried out in a similar manner to that described for Test No. 4. The leach tests were carried out using a North American copper sulphide concentrate. The concentrate assayed 30.3% copper, 34.3% sulphide and 29.9% iron. The copper was present almost exclusively (77% of concentrate mass) as chalcopyrite with only minor quantities (approximately 2% mass) of other copper sulphides (chalcocite, digenite and covellite). The other sulphide present in a significant amount was pyrite (7% mass). The original grind of the concentrate sample was 90% passing 103.8 $\mu$m.

The first two chemical leach tests were carried out at a temperature of 35° C. These two tests were carried out with the slurry redox potential controlled at 394 mV and 444 mV. A second two tests were carried out at the same redox potentials but using concentrate which had been fine milled to 90% passing 6.9 $\mu$m. The test results are summarised in Table 1.

TABLE 1

FERRIC LEACHING OF A NORTH AMERICAN CHALCOPYRITE CONCENTRATE AT 35° C.

| CONCENTRATE GRIND (90% LESS THAN) | SLURRY REDOX POTENTIAL mV vs SCE) | COPPER SOLUBILISED AFTER 48 HRS (%) |
|---|---|---|
| 103.8 | 394 | 10.5 |
| 103.8 | 444 | 16.1 |
| 6.9 | 394 | 16.8 |
| 6.9 | 444 | 15.9 |

Fine milling of chalcopyrite concentrates may often improve leach kinetics and copper extractions by increasing the surface area for leaching or to promote crystallographic dislocations. For this concentrate, finer grinding of the concentrate does not appear to improve leach kinetics and copper extraction. The copper extractions achieved at the two redox potentials employed did not exceed 17%.

For more refractory chalcopyrite concentrates of this sort an increase in the leaching temperature is usually necessary to achieve acceptable copper leach kinetics and extractions.

Figure 8:
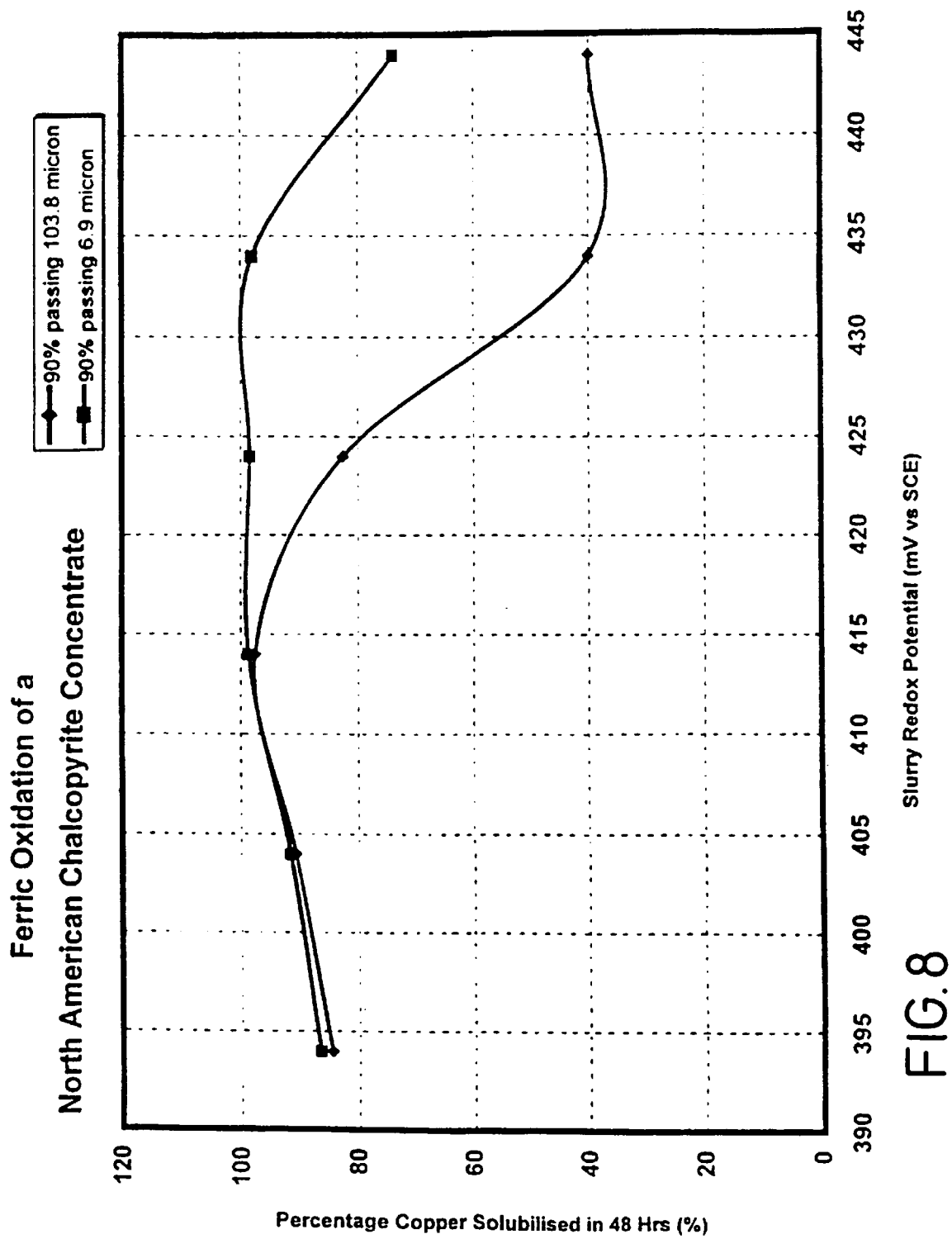
FIG. 8 shows graphical results of leaching of a different chalcopyrite.

A further series of tests were carried out at 70° C. using both the original concentrate and a concentrate sample fine milled to 90% passing 6.9 $\mu$m. Six tests were carried out on each concentrate sample at slurry redox potentials of 394, 404, 414, 424, 434 and 444 mV. The test results are summarised in FIG. 8.

For the fine milled concentrate (90% passing 6.9 $\mu$m) the test results show that high copper recoveries (>98%) are possible within a 48 hour period within a redox potential window of 414 to 434 mV. Above or below this range the copper leach kinetics are less favourable. The test results also show, however, that comparable high copper extractions are also possible for the more coarse original concentrate (90% passing 103.9 $\mu$m) but within a narrower window of redox around 414 mV. It follows that for this concentrate the added processing costs of finer milling of the concentrate to maximise copper leach kinetics and recovery can be avoided by employing the redox potential window of around 414 mV.

Ore Column Leach Tests

Column leach tests using ore particles were designed to simulate an indirect bioheap leach process in which dilute sulphuric-ferric sulphate leach liquor to be percolated over the heap is generated in a separate bacterial ferric generation process external to the heap of ore. A key aspect of this type of indirect bioleach process is that it allows for the redox potential (ferric to ferrous iron ratio) of this leach liquor to be chosen. This can be compared to a direct bioheap leach in which the bacterial oxidation reactions, including oxidation of ferrous iron to ferric iron, occur within the heap of ore and any control of redox potential is extremely difficult, if not impossible.

Figure 9:
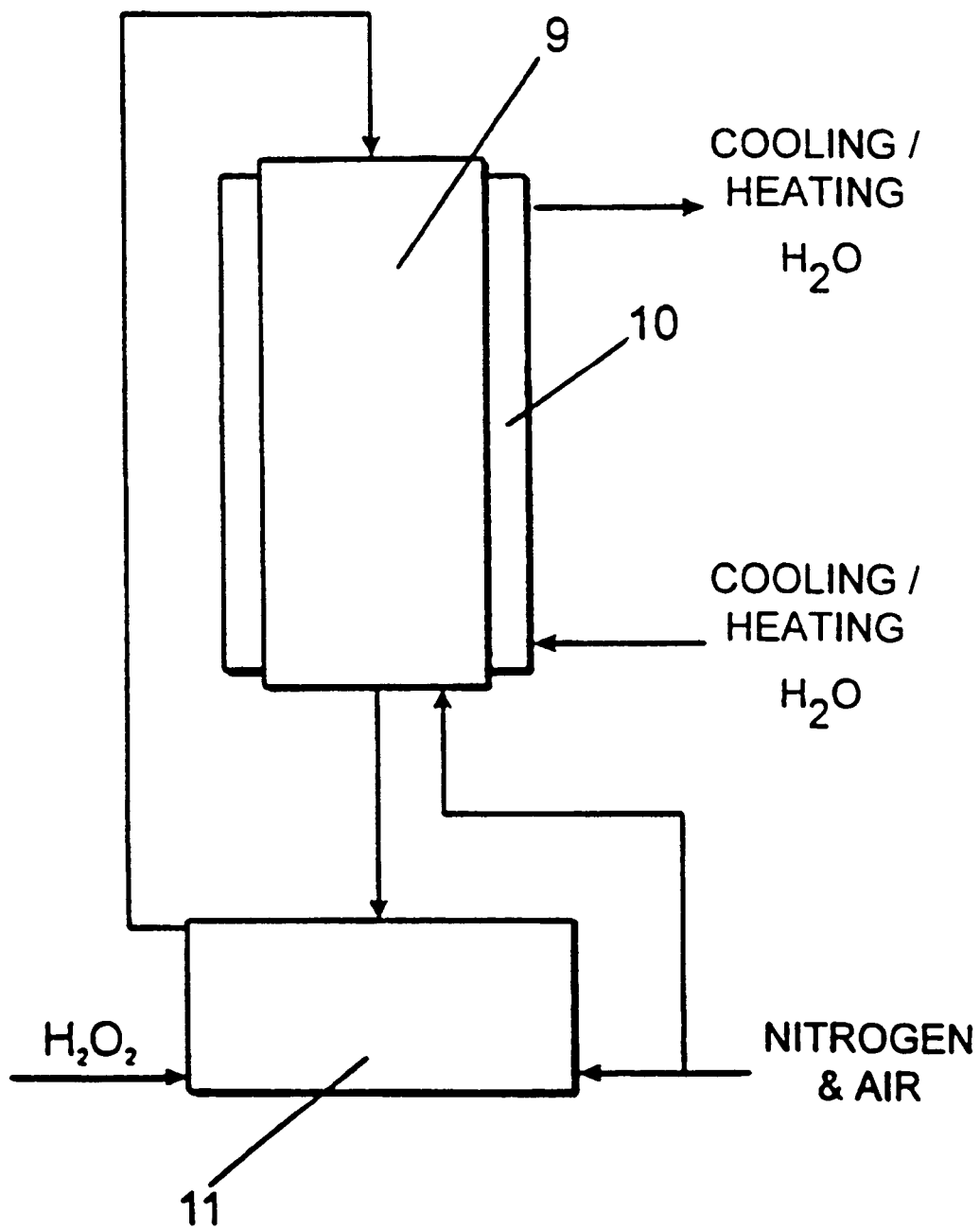
FIG. 9 is a flow diagram illustrating column leaching test apparatus.

The experimental equipment used in the laboratory column leach tests is shown in the attached line diagram of FIG. 9. The column leach tests were carried out using approximately 15 kg of crushed ore sample in 1 meter high by 0.12 meter diameter plastic columns. The columns (9) had a water jacket (10) surround them allowing the temperature in the column to be controlled at 35° C. The liquor was percolated through the column at a rate of 27 liters per square meter of ore surface per hour and collected into the sump (11) below the column. The required ferric:ferrous iron ratio (redox potential) in the sump was controlled at the required level by addition of hydrogen peroxide solution to the sump. This effectively simulated the external bacterial ferric iron generation step. Nitrogen gas was bubbled through the liquor in the sump to promote mixing and also through the column of ore from the base to minimise the chance of bacterial growth being established on the ore particles in the column.

The leach liquor contained the same concentrations of bacterial nutrients indicated for leach Test No. 1. The pH of the leach solution in the sump was controlled at 0.8 by the addition of sulphuric acid.

The ore sample assayed 1.07% copper, 3.5% iron and 2.1% sulphide. Mineralogical analysis indicated that the approximate sulphide mineral mass contents of the ore were 1.5% chalcopyrite; 0.5% chalcocite, digenite and covellite;<0.5% bornite; and 2.5% pyrite. To further assess the amount of non-chalcopyrite copper sulphides and chalcopyrite in the ore, a sample of ore was subjected to cyanide leaching. It is normally found that the non-chalcopyrite copper sulphides are readily soluble in cyanide whereas chalcopyrite is not These leach results indicated that 51% of the copper was present as easily leachable non-chalcopyrite copper sulphides and the remaining 49% as chalcopyrite.

Column Leach Test 1

Figure 10:
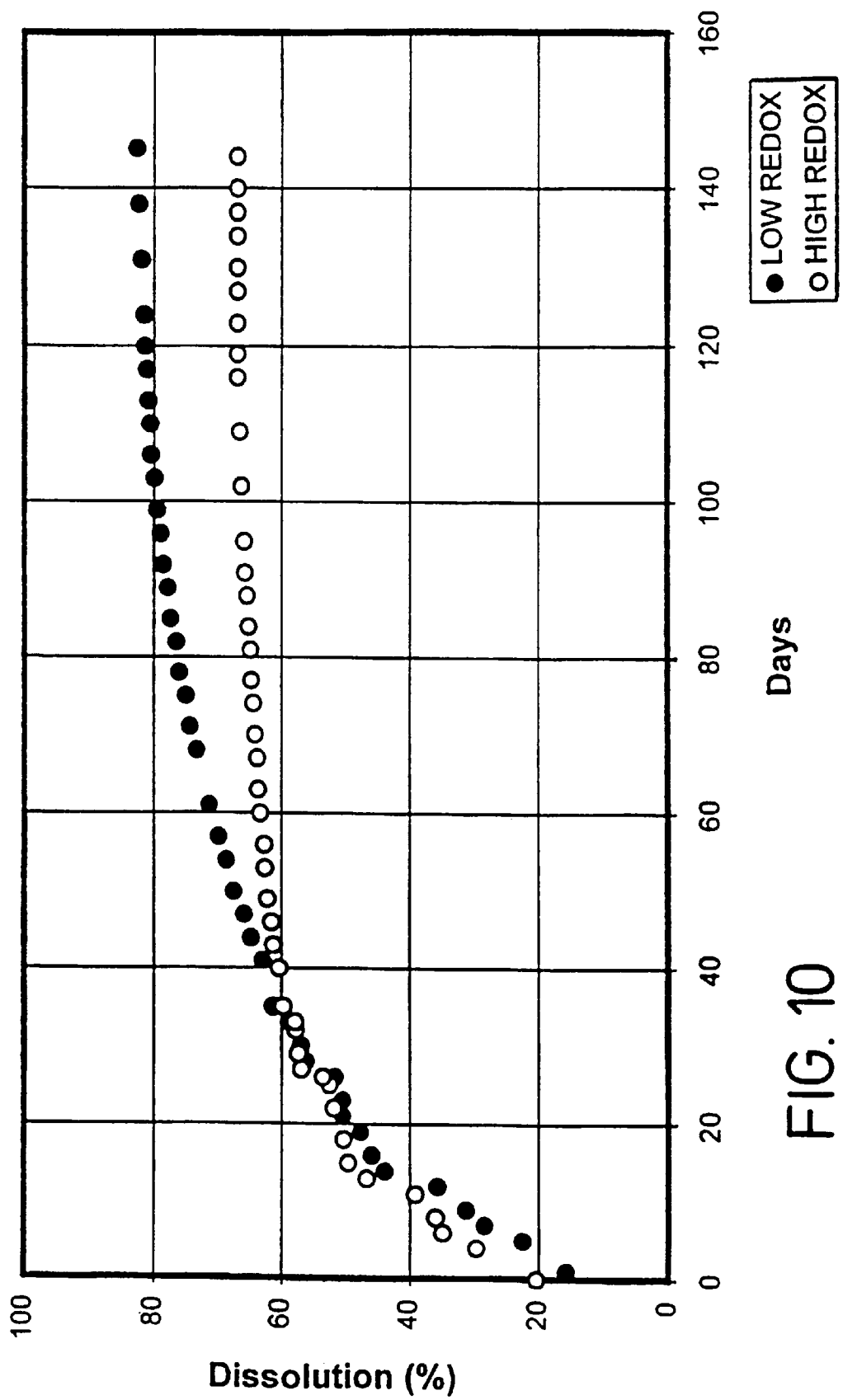
FIGS. 10 & 11 show graphical results of two column leach tests.

Two comparative tests were carried out using ore crushed to minus 6 mm. In the one test the redox potential in the sump was controlled at a "high redox" level of 505 mV, and in the other at a "low redox" level of 396 mV. These results are given in FIG. 10 where the percent copper recovery estimated from copper in solution is plotted against the leaching time. These data show that initially a higher copper extraction rate is achieved, presumably because the easily leachable non-chalcopyrite copper sulphur leach fater at the higher redox potential, with the final exaction levelling off at a maximum copper extraction of 67%. At the lower redox potential the rate of copper leaching is lower, presumably because the non-chalcopyrite copper sulphide leach at a slower rate at the lower redox potential, but with the final copper extraction levelling off at the higher value of 83%. It is reasonable to assume that all the readily leachable copper was leached in each case, and taking the figure of 49% copper occurring as chalcopyrite, it can be calculated that 33% of chalcopyrite copper was leached at the high redox potential. At the lower redox potential it could be similarly calculated that chalcopyrite leaching had increased to 65%.

Column Leach Test 2

Figure 11:
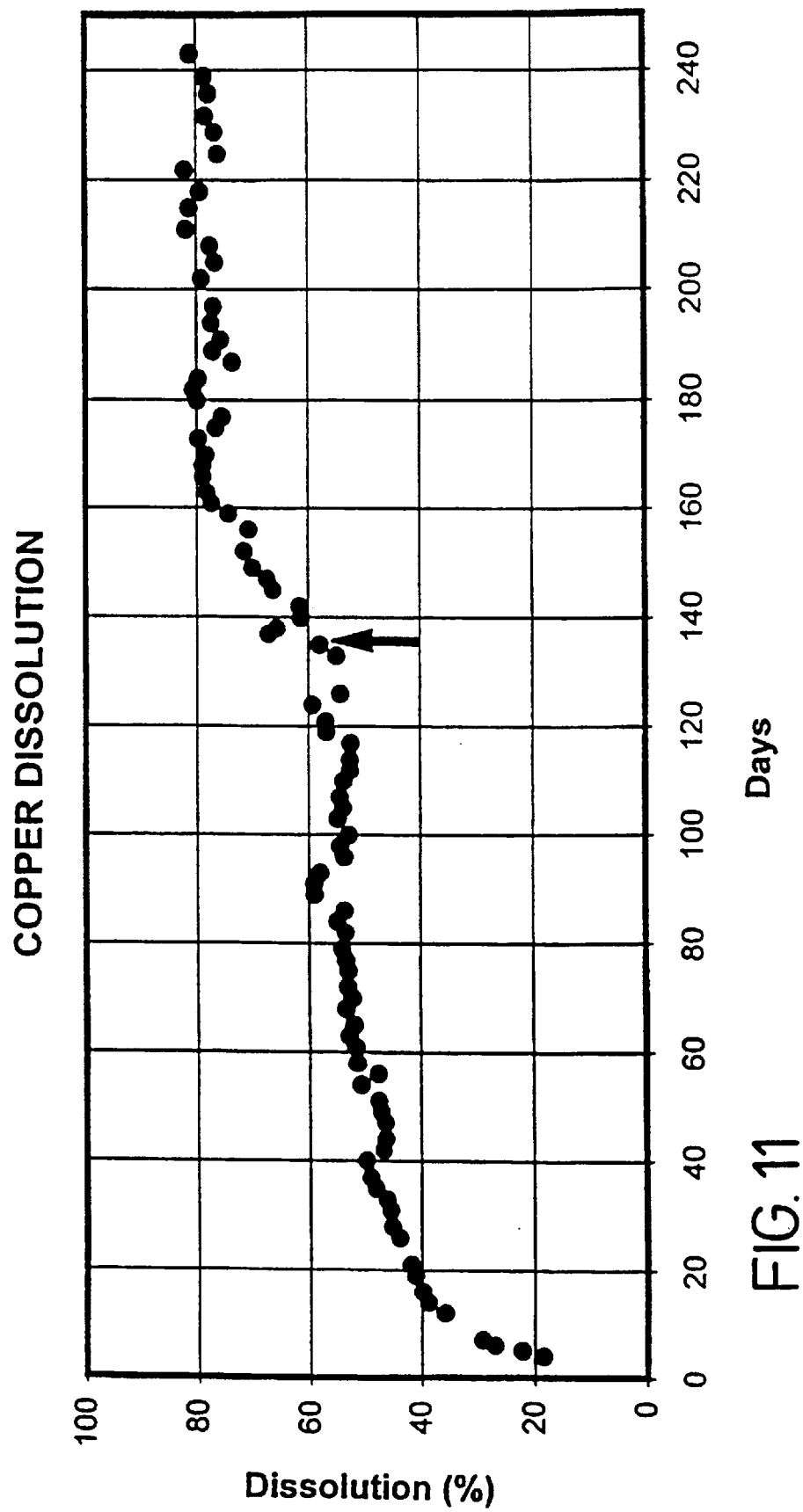

This leach test was similar in most respects to the column leach test 1. In this case the ore sample was crushed to −12 mm and the leach test was carried out in 2 phases—an initial phase up to day 135 in which the high redox (505 mV) was employed and a second phase in which the redox potential was adjusted to the lower level (396 mV). These results are given in FIG. 11.

During the initial high redox potential phase copper extraction finally levelled off at a maximum of 58% after 135 days. Assuming again that all the non-chalcopyrite has leached, ft is calculated that in this case 14% of the chalcopyrite copper had been leached. After the redox potential of the leach soluton was reduced on day 135 additional leaching of copper occurred with the extraction finally levelling off at a value of 81%. It is again calculated that this represents an overall 61% extraction of chalcopyrite copper.

Taken together, the above testwork data indicate lower levels of copper extraction from the chalcopyrite component of the ore at the higher redox potential, where this is typically observed due to passivation of chalcopyrite under these conditions. Leaching in a lower redox window improved chalcopyrite leaching even in a more complex ore percolation leach process where additional factors such as percolation efficiency, mass transfer effects and precipitation of iron and sulphur can be dominating process parameters.

From the above it will be understood that the invention provides an extremely simple process for effectively leaching copper from chalcopyrite which does not involve the use of any costly or otherwise deleterious catalysts or activators and which relies entirely on controlling and setting the leaching parameters and conditions.

It must be understood that other embodiments are possible without departing from the scope of the invention.

What is claimed is:

1. A process for leaching chalcopyrite to extract copper in a leaching reactor with a leach solution including ferric sulphate in the absence of silver as a catalyst to oxidise the sulphide material, comprising maintaining the surface potential of the chalcopyrite within the range of 350–450 mV measured against a standard Calomel reference electrode by controlling the ferric ion to ferrous ion ratio in the leach solution.

2. A process as claimed in claim 1 in which ferrous ion is exposed to bacteria in the presence of oxygen in a bacterial oxidation process to oxidise the ferrous ion to ferric ion.

3. A process as claimed in claim 2 in which the ferric to ferrous ion ratio is controlled by controlling the oxygen supply to the bacterial oxidation process.

4. A process as claimed in either of claim 2 or 3 in which the bacterial oxidation process is carried out in a separate reaction vessel and ferric rich leach solution from the bacterial oxidation process is added to the leaching reactor and ferrous rich leaching solution from the leaching reactor is added to the bacterial oxidation process.

5. A process as claimed in claim 4 in which the redox potential of the bacterial oxidation process in the separate reaction vessel is allowed to proceed beyond the desired redox potential of 350–450 mV for the leaching solution, and the redox potential in the leaching reactor is controlled by controlling the rate of addition of ferric rich leach solution to the leaching reactor.

6. A process as claimed in claim 5 in which the leach solution comprising extracted copper in solved is circulated from the leach process to a copper removal step to remove a portion of the dissolved copper.

7. A process as claimed in any one of claims 1 to 3 in which the process is a heap leaching process in which the leach solution is conditioned to provide the said surface potential.

* * * * *

UNITED STATES PATENT AND TRADEMARK OFFICE
CERTIFICATE OF CORRECTION

PATENT NO.   : 6,277,341 B1
DATED        : August 21, 2001
INVENTOR(S)  : A. Pinches et al.

It is certified that error appears in the above-identified patent and that said Letters Patent is hereby corrected as shown below:

<u>Column 10,</u>
Line 31, "in solved is" should read -- in dissolved form is --

Signed and Sealed this

Nineteenth Day of March, 2002

Attest:

JAMES E. ROGAN
*Director of the United States Patent and Trademark Office*

*Attesting Officer*